United States Patent
Romero Zambrano et al.

(10) Patent No.: US 11,575,692 B2
(45) Date of Patent: Feb. 7, 2023

(54) IDENTITY SPRAY ATTACK DETECTION WITH ADAPTIVE CLASSIFICATION

(71) Applicant: Microsoft Technology Licensing, LLC, Redmond, WA (US)

(72) Inventors: Sergio Romero Zambrano, Seattle, WA (US); Andrew Numainville, Kent, WA (US); Maria Puertas Calvo, Seattle, WA (US); Abbinayaa Subramanian, Kirkland, WA (US); Pui Yin Winfred Wong, Redmond, WA (US); Dana S. Kaufman, Redmond, WA (US); Eliza Kuzmenko, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 276 days.

(21) Appl. No.: 17/112,780

(22) Filed: Dec. 4, 2020

(65) Prior Publication Data
US 2022/0182397 A1 Jun. 9, 2022

(51) Int. Cl.
*H04L 9/40* (2022.01)
*G06N 20/00* (2019.01)
*G06N 5/04* (2006.01)

(52) U.S. Cl.
CPC ......... *H04L 63/1416* (2013.01); *G06N 5/04* (2013.01); *G06N 20/00* (2019.01)

(58) Field of Classification Search
CPC ... H04L 63/1416; H04L 63/08; H04L 63/205; G06N 20/00; G06N 5/04

(Continued)

(56) References Cited

U.S. PATENT DOCUMENTS 10,430,586 B1 * 10/2019 Paithane ............... G06F 21/566
2007/0226785 A1 9/2007 Chow et al.

(Continued)

OTHER PUBLICATIONS

"5 Top Machine Learning Use Cases for Security", retrieved from <<https://www.mdsny.com/5-top-machine-learning-use-cases-for-security/>>, no later than Nov. 5, 2020, 7 pages.

(Continued)

*Primary Examiner* — Jeffrey C Pwu
*Assistant Examiner* — Paul J Skwierawski
(74) *Attorney, Agent, or Firm* — Ogilvie Law Firm

(57) ABSTRACT

To detect identity spray attacks, a machine learning model classifies account access attempts as authorized or unauthorized, based on dozens of different pieces of information (machine learning model features). Boosted tree, neural net, and other machine learning model technologies may be employed. Model training data may include user agent reputation data, IP address reputation data, device or agent or location familiarity indications, protocol identifications, aggregate values, and other data. Account credential hash sets or hash lists may serve as model inputs. Hashes may be truncated to further protect user privacy. Classifying an access attempt as unauthorized may trigger application of multifactor authentication, password change requirements, account suspension, or other security enhancements. Statistical or heuristic detections may supplement the model. However, the model may adapt to changed attacker behavior through retraining with updated data, making the model-based approach more effective over time than rigid statistical or heuristic detection approaches.

20 Claims, 4 Drawing Sheets

---

SOME EXAMPLES OF TRAINING DATA 308 FOR EXCLUSION

| USER AGENT STRING 702 | COUNTRY NAME 704 | ERROR CODE 708 |

| APPLICATION NAME 706 | ATTRIBUTE 710 SPECIFIC TO A GIVEN ATTACK |

AUTHENTICATION PROTOCOL 604 IDENTIFICATION 612

(58) Field of Classification Search
USPC .......................................................... 726/23
See application file for complete search history.

(56) References Cited

U.S. PATENT DOCUMENTS

| | | | |
|---|---|---|---|
| 2007/0245414 | A1 | 10/2007 | Chan et al. |
| 2009/0260072 | A1 | 10/2009 | Rouskov et al. |
| 2009/0300744 | A1 | 12/2009 | Guo et al. |
| 2011/0214173 | A1 | 9/2011 | Kamel et al. |
| 2011/0247055 | A1 | 10/2011 | Guo et al. |
| 2012/0079585 | A1 | 3/2012 | Chan et al. |
| 2014/0123257 | A1 | 5/2014 | Gordon et al. |
| 2015/0339477 | A1 | 11/2015 | Abrams et al. |
| 2016/0300059 | A1 | 10/2016 | Abrams et al. |
| 2017/0208075 | A1 | 7/2017 | Kerametlian et al. |
| 2018/0060888 | A1 | 3/2018 | Arora et al. |
| 2019/0007371 | A1 | 1/2019 | Burton et al. |
| 2019/0089710 | A1 | 3/2019 | Weinert et al. |
| 2019/0124112 | A1* | 4/2019 | Thomas ................ H04L 67/104 |
| 2020/0007535 | A1 | 1/2020 | Barhudarian et al. |
| 2020/0267178 | A1* | 8/2020 | Maor .................. H04L 63/1425 |
| 2021/0288981 | A1* | 9/2021 | Numainville ....... H04L 63/1441 |

OTHER PUBLICATIONS

Alex Weinert, "Advancing Password Spray Attack Detection", retrieved from <<https://techcommunity.microsoft.com/t5/azure-active-directory-identity/advancing-password-spray-attack-detection/ba-p/1276936>>, Nov. 2, 2020, 5 pages.

"Enforce on-premises Azure AD Password Protection for Active Directory Domain Services", retrieved from <<https://docs.microsoft.com/en-us/azure/active-directory/authentication/concept-password-ban-bad-on-premises>>, Jul. 17, 2020, 6 pages.

"FloCon 2019: Simulating Your Way to Security—One Detector at a Time", retrieved from <<https://flocon2019.sched.com/event/Gom3/simulating-your-way-to-security-one-detector-at-a-time>>, Jan. 9, 2019, 3 pages.

"Gradient boosting", retrieved from <<https://en.wikipedia.org/wiki/Gradient_boosting>>, Oct. 17, 2020, 8 pages.

Sergiu Gatlan, "Microsoft upgrades password spray attack detection capabilities", retrieved from <<https://www.bleepingcomputer.com/news/security/microsoft-upgrades-password-spray-attack-detection-capabilities/>>, Oct. 26, 2020, 10 pages.

"Azure Active Directory: our vision and roadmap to help you secure remote access and boost employee productivity", retrieved from <<https://myignite.microsoft.com/sessions/6ff1bb44-d2cf-4002-9db5-ab90c96fccf2>>, Sep. 22, 2020, 4 pages.

"Building Digital Resilience", retrieved from <<https://myignite.microsoft.com/sessions/0eaefb05-0020-457b-be25-f5c71810d8ba>>, Sep. 22, 2020, 3 pages.

Cameron Era and Yassir Abousselham, "Password spraying detection: Where do I start?", retrieved from <<https://www.okta.com/blog/2019/03/password-spraying-detection-where-to-start/>>, Mar. 25, 2019, 9 pages.

Diana Kelley, "Protecting your organization against password spray attacks", retrieved from <<https://www.microsoft.com/security/blog/2020/04/23/protecting-organization-password-spray-attacks/>>, Apr. 23, 2020, 8 pages.

"RiskDetection resource type", retrieved from <<https://docs.microsoft.com/en-us/graph/api/resources/riskdetection?view=graph-rest-1.0&viewFallbackFrom=graph-rest-v1.0>>, Oct. 16, 2020, 4 pages.

"SecureAuth IdP adds adaptive access control enhancements", retrieved from <<https://www.helpnetsecurity.com/2018/10/12/secureauth-idp-enhancements/>>, Oct. 12, 2018, 3 pages.

Mathew Richards, "The Definitive Guide to Azure Sentinel: Everything You Need to Know to get started with Microsoft's cloud SIEM", retrieved from <<https://thirdspace.net/blog/definitive-guide-microsoft-azure-sentinel-everything-need-know/>>, Sep. 17, 2019, 18 pages.

"What is Identity Protection?", retrieved from <<https://docs.microsoft.com/en-us/azure/active-directory/identity-protection/overview-identity-protection>>, Aug. 24, 2020, 6 pages.

"What is risk?", retrieved from <<https://docs.microsoft.com/en-us/azure/active-directory/identity-protection/concept-dentity-protection-risks>>, Sep. 10, 2020, 7 pages.

Eliza Kuzmenko and Sergio Romero, "The science behind Azure Active Directory Identity Protection [video access]", retrieved from <<https://myignite.microsoft.com/sessions/2c1d5ca9-3e73-4107-af81-02ea5bb8d734>>, no later than Sep. 24, 2020, 3 pages.

Eliza Kuzmenko and Sergio Romero, "The science behind Azure Active Directory Identity Protection [slides]", retrieved via <<https://myignite.microsoft.com/sessions/2c1d5ca9-3e73-4107-af81-02ea5bb8d734>>, no later than Sep. 24, 2020, 23 pages.

* cited by examiner

SOME EXAMPLES OF MACHINE LEARNING CLASSIFICATION MODELS 302

BOOSTED TREE 402   ENSEMBLE 410   RANDOM FOREST 404

NEURAL NETWORK 408   LOGISTIC REGRESSION 406

Fig. 4

SOME EXAMPLES OF SECURITY ENHANCEMENTS 304

ENHANCEMENT 502: MARK 504 ACCOUNT AS COMPROMISED

ENHANCEMENT 506: GENERATE 508 SECURITY ALERT 510

ENHANCEMENT 512: BLOCK 514 AUTHENTICATION REQUEST 516

ENHANCEMENT 518: FORCE 520 PASSWORD 522 UPDATE

ENHANCEMENT 524: ASK 526 FOR MULTIFACTOR AUTHENTICATION 528

ENHANCEMENT 530: SUSPEND 532 ACCOUNT

Fig. 5

SOME EXAMPLES OF TRAINING DATA 308 FOR INCLUSION

USER AGENT REPUTATION DATA 312 AGGREGATE 640

PROTOCOL 604 IDENTIFICATION 602   CREDENTIAL SET / LIST 636 / 638

INVALID USERNAME 606 COUNT 608   INTERNET SYSTEM NUMBER (ASN) 632

DISTINCT FAILED CREDENTIAL 610 HASH 612 COUNT 614

SUCCESSFUL OR FAILED ACCESS ATTEMPT: RATE 616 OR RATIO 618

DISTANCE 620 FROM APPARENT LOCATION 622 TO FAMILIAR LOCATION 624

INDICATION 626 WHETHER ATTRIBUTE 628 IS FAMILIAR ATTRIBUTE 630

Fig. 6

| SOME EXAMPLES OF TRAINING DATA 308 FOR EXCLUSION |||
|---|---|---|
| USER AGENT STRING 702 | COUNTRY NAME 704 | ERROR CODE 708 |
| APPLICATION NAME 706 | ATTRIBUTE 710 SPECIFIC TO A GIVEN ATTACK ||
| AUTHENTICATION PROTOCOL 604 IDENTIFICATION 612 |||

| SOME EXAMPLES OF USER AGENT REPUTATION DATA 312 ||
|---|---|
| USER 104 ID 606 | MOBILE APPLICATION 1008 ID 1006 |
| CLIENT APPLICATION 1010 ID 1012 | BROWSER 1002 ID 1004 |

IDENTITY SPRAY ATTACK DETECTION WITH ADAPTIVE CLASSIFICATION

BACKGROUND

Attacks on computing systems take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within a computing system. No single security mechanism is able to detect every kind of cyberattack, or able to end every detected cyberattack. But sometimes combining and layering a sufficient number and variety of defenses will deter an attacker, or at least limit the scope of harm from an attack.

To implement defense in depth, cybersecurity professionals consider the different kinds of attacks that could be made. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place.

In particular, installing tools and techniques for detecting and limiting identity attacks is one of the many possibilities to consider when implementing defense in depth. Some examples of identity attacks include "password spray" attacks in which an attacker tests a given password against multiple accounts. If none of the accounts accept the first password tried, then a second password may be sprayed or stuffed, i.e., tested against multiple accounts. In a "credential stuffing" identity attack, an attacker tries to access a website B using credentials from a breached website A. In general, an identity attack continues until it is detected and shut down, or until the attacker succeeds in gaining illicit access to one or more desired accounts and moves on to the next phase of the attack, such as installing malware, exfiltrating data, or encrypting data to hold it for ransom.

SUMMARY

Some embodiments described in this document provide improved technology for detecting the likely presence of attacker activity in a monitored computer network. In particular, some embodiments use machine learning to classify account access attempts as authorized or unauthorized, or by assigning or leveraging a risk level scoring, or both. These embodiments look beyond the mere number of failed sign-ins by automatically considering dozens (or even hundreds) of different pieces of information about account access activities, in the form of machine learning model features.

Some embodiments use or provide an attack detection hardware and software combination which is configured for automatic adaptive detection of an identity attack and for initiating an automatic defense against the identity attack. The combination includes a digital memory, a machine learning model interface, and a processor which is in operable communication with the memory. The interfaced machine learning model is configured according to training data which includes user agent reputation data and IP address reputation data. The processor is configured, e.g., by tailored software, to perform identity spray attack detection steps, which include (a) noting an attempt to access an account, (b) determining whether the account is under an identity spray attack, (c) in response to determining that the account is under the identity spray attack, utilizing the machine learning model to classify the attempt, and (d) in response to classifying the attempt as an unauthorized attempt, applying a security enhancement to the account. The embodiment enhances cybersecurity by detecting behavior which indicates an identity attack and by applying the security enhancement. Unlike attack detection approaches that rely on statistics alone or heuristics alone, such an embodiment's attack detection utilizes the machine learning model, which can be continuously retrained to adapt to changes in attacker behavior.

Some embodiments provide or use a method for adaptively detecting identity spray attacks, including: noting an attempt to access an account of a computing system; determining whether the account is under an identity spray attack; when the determining determines that the account is under the identity spray attack, utilizing a machine learning model to classify the attempt, the machine learning model configured according to training data which includes user agent reputation data and IP address reputation data; and when the classifying classifies the attempt as an unauthorized attempt, applying a security enhancement to the account. In particular, in some embodiments, the method enhances cybersecurity by detecting behavior which indicates an identity attack and by imposing an access restriction security enhancement in response to the behavior, e.g., by locking an account, blocking an IP address, or requiring additional authentication before access to an account is allowed.

Some embodiments provide or use a method that includes training a machine learning model for access attempt classification. In some, the training is performed at least in part through supervised machine learning with training data that includes user agent reputation data and IP address reputation data.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a block diagram illustrating some examples of machine learning models;

FIG. 5 is a block diagram illustrating some examples of security enhancements;

FIG. 6 is a block diagram illustrating some examples of data to be included when training a machine learning model;

DETAILED DESCRIPTION

Overview

Innovations may expand beyond their origins, but understanding an innovation's origins can help one more fully appreciate the innovation. In the present case, some teachings described herein were motivated by technical challenges faced by Microsoft innovators who were working to improve the usability of Microsoft cybersecurity offerings.

In particular, a technical challenge was to how to automatically and efficiently detect identity spray attacks against accounts in a cloud or other computer network. Even more particularly, the innovators faced the technical challenge of detecting identity spray attacks more efficiently and effectively than existing approaches that relied on per IP address totals, because such approaches may be circumvented by attackers who cycle through thousands of IPs to keep the request volume of each IP to a minimum.

To meet these and other technical challenges, some identity spray attack detection approaches taught herein provide or use an algorithm, process, or mechanism that is complementary to some pre-existing approaches. By utilizing additional signals, some embodiments detect identity spray attacks that span across multiple IP addresses. Depending on the embodiment, these additional signals may include data such as, for example, credential hash sets, credential hash lists (a.k.a. credential hash orders), user agent reputation data, IP address reputation data, authorization protocol identification, client application identification, origin location familiarity, origin device familiarity, origin location repetition (a.k.a. location periodicity count), legacy risk scores (e.g., adaptive protection risk score or risk level), or legacy security service data (e.g., Evolved Security Token Service data or another security token service).

Some embodiments also apply security enhancements to accounts that have apparently been compromised by an identity attack, or that appear to be at high risk of being compromised. Security enhancements may include locking an account even before the published lockout level of failed sign-ins has been reached, or blocking an IP address from further communication with accounts even before an established IP blocking level of failed sign-ins has been reached, for example. Other defensive measures may require additional authentication for account access, e.g., require multifactor authentication, or notify administrators, or otherwise restrict access. Multiple defensive measures may be initiated or imposed on a given account.

Other aspects of these embodiments, and other identity attack detection enhancement embodiments, are also described herein.

Operating Environments

Figure 1:
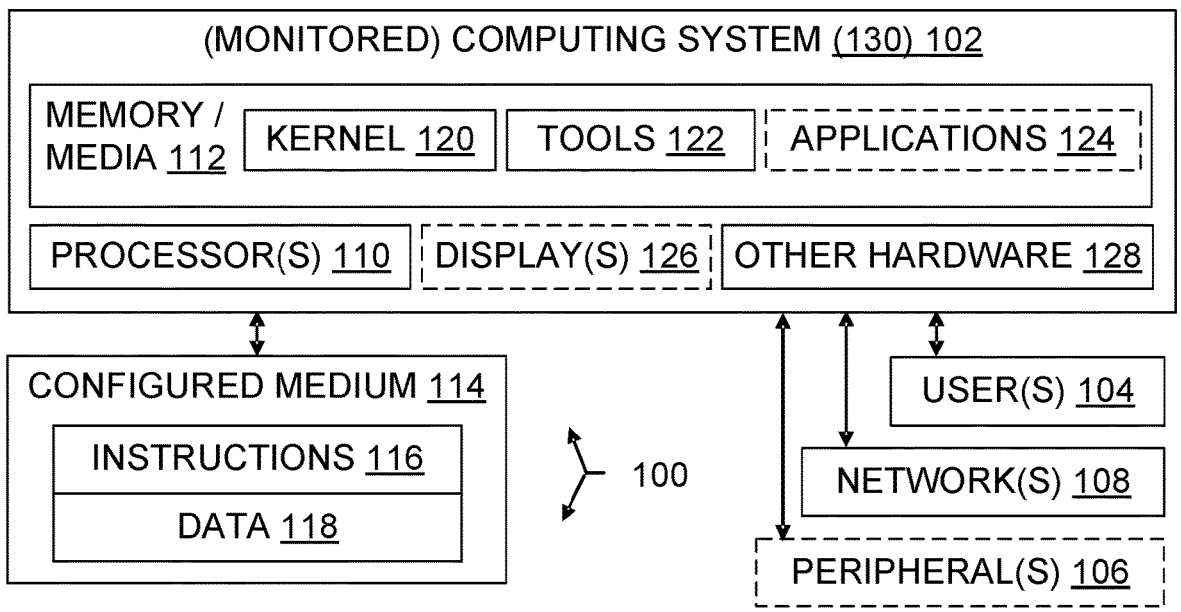
FIG. 1 is a block diagram illustrating computer systems generally and also illustrating configured storage media generally.

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, identity spray attack detection functionality could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
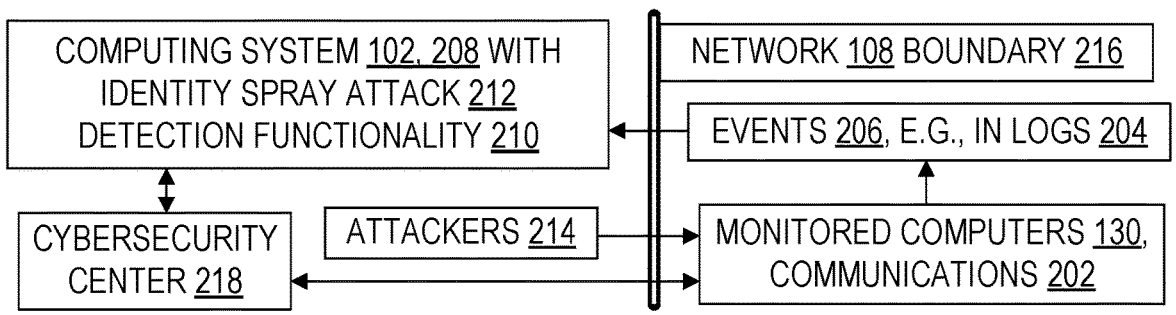
FIG. 2 is a block diagram illustrating a monitored network of computers and an identity spray attack detection system and aspects of their environment.

FIG. 2 illustrates an environment having a monitored network 108, 130. The monitored network includes monitored computers 102, 130 that send or receive communications 202 over network 108 connections. Monitoring produces logs 204 that describe events 206, such as login attempts, data transfers, and other network activity. "Data transfer" may refer to the act of transferring data to computer or may refer to a memorialization of that act in a log; "transfer" does not imply removal of an original, but rather is used interchangeably with "transmit" or "send a copy".

An enhanced identity attack detection system 208 receives, e.g., the events and other signals, and analyzes them as taught herein using identity spray attack detection functionality 210 such as specialized software configured to operate as taught herein, e.g., by obtaining and using classification output 324 from a trained machine learning model 302. An identity attack detection system 208 may go beyond merely detecting an identity attack 212, by initiating or imposing defensive measures or other security enhancements 304 that are designed to restrict access to the monitored computer(s) 130. A system 208 "initiates" a defensive measure by requesting that another system perform the defensive measure, while a system 208 "imposes" a defensive measure by itself performing the defensive measure.

Such defensive measures may be referred to expressly for emphasis, e.g., as parts or behaviors of a "detection and defense system" 208. But unless defensive measures are explicitly excluded, it is understood herein that identity attack detection systems and methods not only include functionality to detect identity attacks but also include functionality to initiate or impose defensive measures 304 against detected or suspected attacks. Defensive measures and security enhancements generally are referred to herein using reference numeral 304.

An identity attack 212 may be caused or instigated by one or more attackers 214. In the illustrated environment of FIG. 2, the attackers 214 reside outside a network boundary 216 that is defined, e.g., by firewalls. But teachings herein may also be advantageously applied to detect identity attacks perpetrated by insider attackers.

Moreover, in the illustrated environment, the identity attack detection system 208 resides outside the monitored network 130, but in other environments an identity attack detection system 208 resides inside the monitored network 130. Similarly, the illustrated environment shows the identity attack detection system 208 communicating with a separately located cybersecurity center 218, but in other environments an identity attack detection system 208 resides inside the cybersecurity center 218, and in others the identity attack detection system 208 operates without any cybersecurity center 218 per se.

In some embodiments, a spray attack detection system with an ML model 302 that was trained using at least user agent reputation data 312 and IP address reputation data 316. This enhanced system runs software to do steps such as checking 804 whether an account is under attack when an attempt is made to access the account, using 806 the ML model to classify 808 the access attempt, and then enhancing 810 security if the ML model classifies the access attempt as unauthorized. Password spray attacks are an example of "identity spray attacks", which include spray attacks 212 that use passwords, pass phrases, or other identity credentials.

In some embodiments, determining 804 whether the account is under an identity spray attack is done by checking whether the number of distinct passwords used against the account 322 with a specified time period passes a specified password count threshold. Some examples of possible password count thresholds are 5, 8, and 10, and some examples of possible time periods are 24 hours, 12 hours, 6 hours, and 1 hour, but embodiments are not limited to these specific thresholds or time periods unless expressly so stated.

Figure 3:
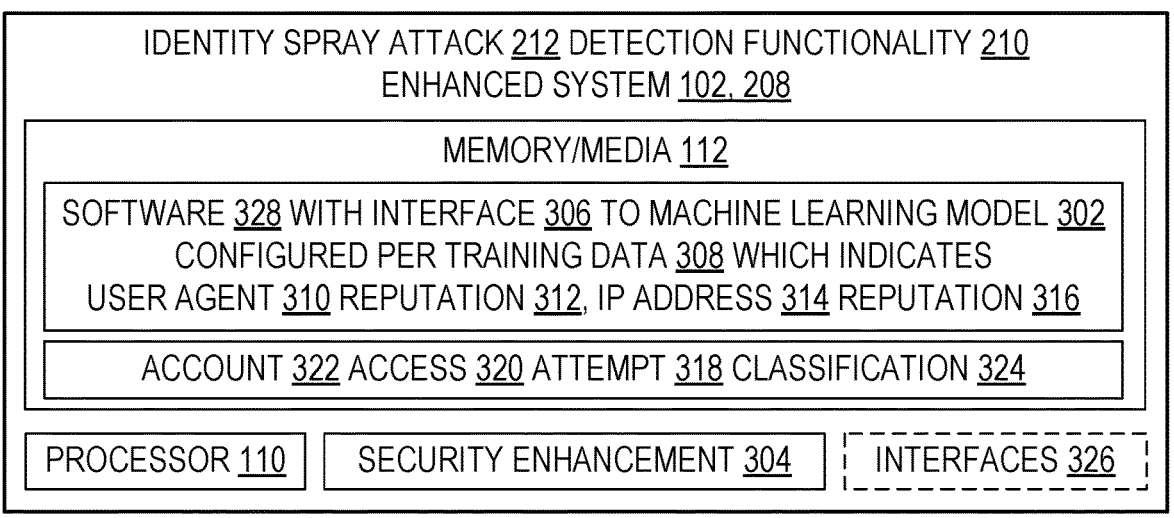
FIG. 3 is a block diagram illustrating an enhanced system configured with functionality to detect identity spray attacks.

FIG. 3 illustrates an enhanced system 208 which is configured to detect identity attacks and to initiate or impose defensive measures 304 against such attacks. The system 208 may be networked through an interface 326. The illustrated system 208 includes identity attack detection and defense software 328 with an interface 306 to a trained ML model 302 detect identity attacks. For example, the software 328 may perform a method 800 illustrated in FIG. 8 or facilitate data flow as in FIG. 11.

FIG. 4 shows some examples of machine learning technologies generally, as implemented in models 302. These items are discussed at various points herein, and additional details regarding them are provided in the discussion of a List of Reference Numerals later in this disclosure document.

FIG. 5 shows some examples of security enhancements 304. These items are discussed at various points herein, and additional details regarding them are provided in the discussion of a List of Reference Numerals later in this disclosure document.

Figures 7, 8, 10:
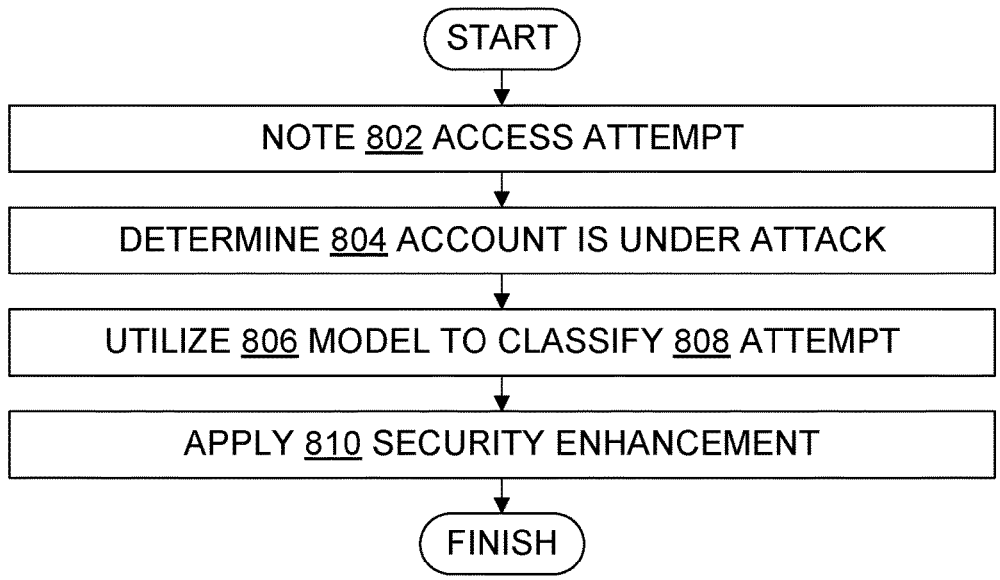
FIG. 7 is a block diagram illustrating some examples of data to be excluded when training a machine learning model.
FIG. 8 is a flowchart illustrating steps in some identity spray attack detection and defense methods.
FIG. 10 is a block diagram illustrating some examples of user agent reputation data.

FIGS. 6, 7, and 10 each show some examples of training data 308. These categories or types of data 308 are discussed at various points herein, and additional details regarding them are provided in the discussion of a List of Reference Numerals later in this disclosure document.

Some embodiments use or provide a functionality-enhanced system, such as system 208 or another system 102 that is enhanced as taught herein. In some embodiments, an attack detection system which is configured for automatic detection of an identity attack and for initiating an automatic defense against the identity attack includes a digital memory 112, an interface 306, and a processor 110 in operable communication with the memory. The interface 306 gives the processor and memory operable communication with a machine learning model 302 that is configured according to training data 308 which includes user agent 310 reputation data 312 and IP address 314 reputation data 316.

The processor 110 is configured to perform steps for adaptively detecting identity spray attacks. The steps include (a) noting 802 an attempt 318 to access 320 an account 322, (b) determining 804 whether the account is under an identity spray attack 212, (c) in response to determining 804 that the account is under the identity spray attack, utilizing 806 the machine learning model 302 to classify 808 the attempt, and (d) in response to classifying the attempt as an unauthorized attempt 324, applying 810 a security enhancement 304 to the account.

In some embodiments, the machine learning model 302 includes at least one of the following: a boosted tree classification model 402, a random forest classification model 404, a logistic regression classification model 406, a neural network classification model 408, or an ensemble classification model 410. In each case, the model is trained using particular signals and data 308 as taught herein, and in each case the model output 324 drives security enhancement operations 810 as taught herein.

Some of the security enhancements 304 that may be applied 810 to an account 322 in a given embodiment include one or more of the following: marking 504 the account as compromised, generating 508 a security alert 510 which indicates the account access was classified 808 as unauthorized, blocking 514 an authentication request 516, forcing 520 a user to update their password 522, asking 526 a user to perform multifactor authentication 528, or temporarily suspending 532 access to the account.

In some embodiments, the machine learning model 302 is configured according to training data 308 which includes at least one of the following: a protocol identification 602 identifying a network protocol 604 used during failed access attempts (e.g., Client Type, a.k.a. Protocol, e.g., IMAP; a miss score cutoff may be different for each protocol), an invalid username 606 count 608 (e.g., an IP-based count or a User-Agent-based count, or both), a distinct failed credential 610 hash 612 count 614 (e.g., an IP-based count or a User-Agent-based count, or both), a successful access attempt rate 616 or a failed access attempt rate 616 or a ratio 618 of successful access attempts to failed access attempts (could be IP-based or User-Agent-based, or both), a distance 620 from an access attempt apparent location 622 to a previously defined familiar location 624 (e.g., an exact distance such as 513 miles, or an approximate distance such as approximately 500 miles, or an estimated distance such as 500 miles plus or minus 50 miles, or such as 400 to 600 miles), or an indication 626 of whether an access attempt attribute 628 is a previously defined familiar attribute 630 used in an authorized access (e.g., a Device ID, an IP address, a browser ID, an ASN 632, a geolocation, or more than one of these).

In some embodiments, a primary consideration is which data 118 to include 902 in the training data 308 while configuring (training) the ML model 302. In some embodiments, a primary consideration is which data 118 to exclude 904 from the training data 308 while configuring (training) the ML model 302. In some embodiments, both the selection of data to include as training data 308 and the selection of data to exclude from the training data are primary considerations.

As to data 118 exclusion from training data 308, in particular in some embodiments the machine learning model 302 is configured 906 according to training data 308 which has been selected or filtered or both to expressly exclude 904 at least three of the following: user agent strings 702, country names 704, application names 706, error codes 708, or access attempt attributes 710 which are specific to a particular attack 212. In some embodiments only one or two of these are excluded, while in some four of them, or all five of them, are excluded. Exclusion may reduce overtraining of the model, which results in the model failing to generalize beyond specific attacks sufficiently to recognize other attacks 212.

At least one kind of data 118—authentication protocol identification 602—may be beneficially included 902 or be beneficially excluded 904 while training 906 an ML model 302. Whether inclusion or exclusion of such data 118 is more beneficial for attack 212 detection can be determined by persons of skill in the art through a modicum of experimentation with a given implementation.

More generally, authentication protocol may serve as a signal 1108. One example is a distinction made in some embodiments between ModernAuth (e.g., OpenID Connect) and Legacy Auth (e.g., Web Services Trust, password-based authentication protocols for IMAP or SMTP). In some embodiments, an authentication protocol 604 is a training signal 1108, in that the machine learning model 302 is configured 906 according to training data 308 which has been selected or filtered or both, to expressly exclude 904 or to expressly include 902, access attempts 318 which use one or more specified authentication protocols.

Machines or processes within an enhanced system 208 may be networked generally or communicate in particular (via network or otherwise) with one another and with external devices (e.g., public search engines, public translation engines) through one or more interfaces 326. An interface 326 may include hardware such as network interface cards, software such as network stacks, APIs, or sockets, combination items such as network connections, or a combination thereof.

Other system embodiments are also described herein, either directly or derivable as system versions of described processes or configured media, duly informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, mechanisms, sequences, data structures, or functionalities for instance, and may otherwise depart from the examples provided herein.

Processes (a.k.a. Methods)

Figure 9:
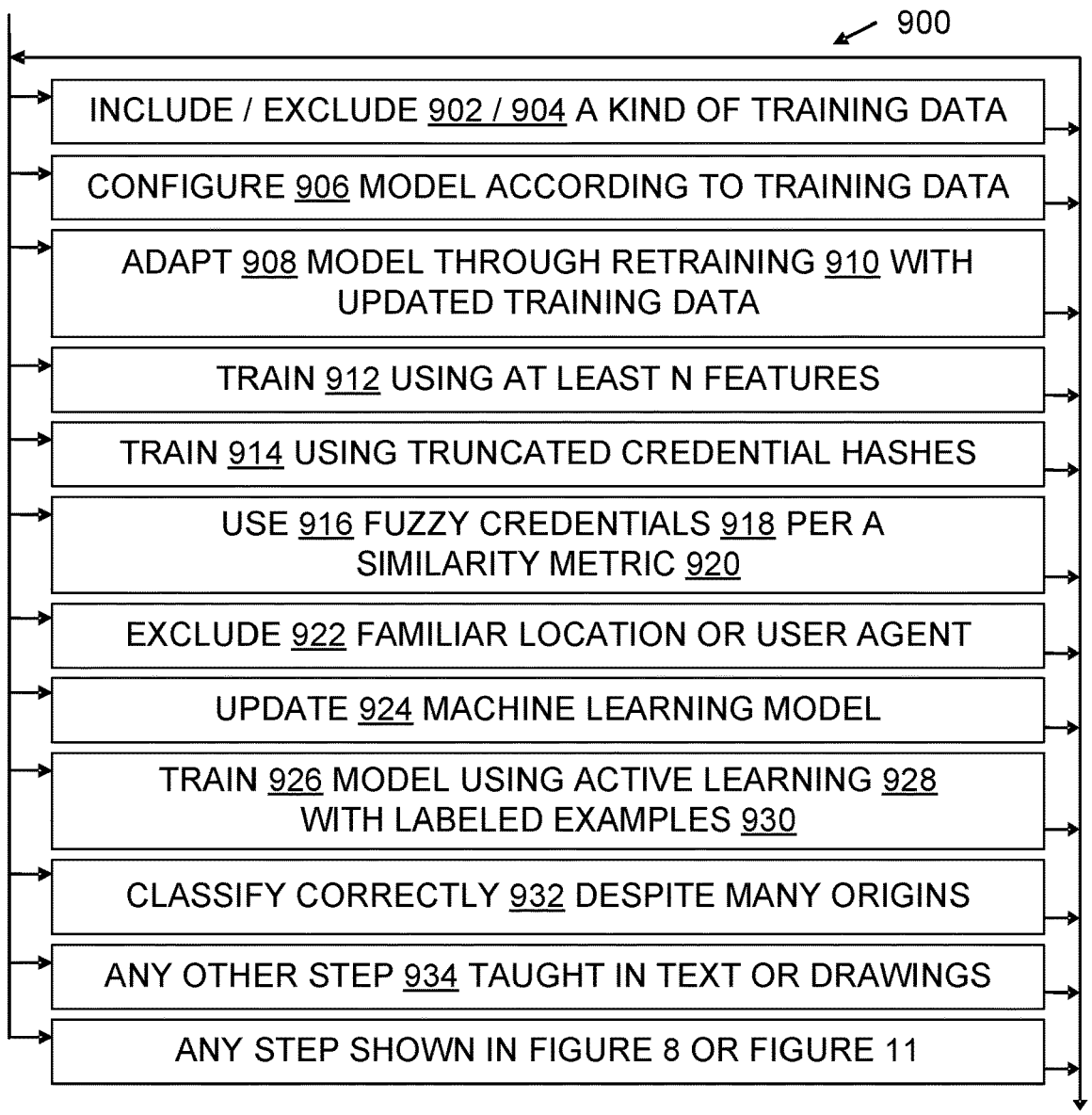
FIG. 9 is a flowchart further illustrating steps in some identity spray attack detection and defense methods.
Figure 11:
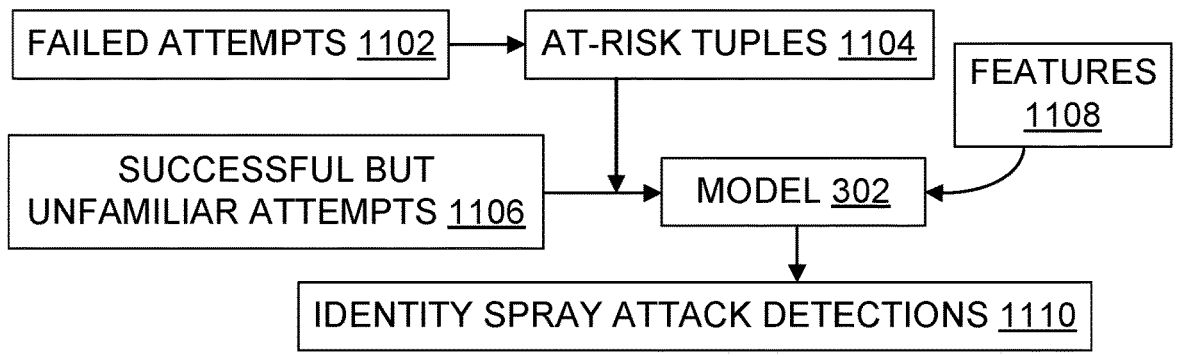
FIG. 11 is an architectural diagram illustrating data flow in some identity spray attack detection and defense systems and their environment.

FIG. 8 illustrates a family of methods 800 that may be performed or assisted by an enhanced system, such as system 208 or another functionality 210 enhanced system as taught herein. FIGS. 9 and 11 further illustrate identity attack detection methods (which may also be referred to as "processes" in the legal sense of that word) that are suitable for use during operation of a system which has innovative functionality taught herein. FIGS. 9 and 11 include some refinements, supplements, or contextual actions for steps shown in FIG. 8. FIG. 9 also incorporates steps shown in FIG. 8 or 11.

Technical processes shown in the Figures or otherwise disclosed will be performed automatically, e.g., by an enhanced SIEM tool 122, 208, unless otherwise indicated. Processes may also be performed in part automatically and in part manually to the extent action by a human administrator or other human person is implicated, e.g., in some embodiments a human administrator may specify respective values for thresholds on one or more counts 608, 614 or distances 620, or perform manual labeling to create or modify training data 308. No process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 8 and 9. Steps may be performed serially, in a partially overlapping manner, or fully in parallel. In particular, the order in which flowchart 800 action items or flowchart 900 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

The present disclosure distinguishes between "initiating" an access restriction or other defense 304 and "imposing" one; applying 810 a security enhancement includes initiating the security enhancement or imposing the security enhancement or doing both. Initiating includes making a request for an access restriction or other security enhancement but does not require that the security enhancement actually happen, whereas imposing does require that the security enhancement actually happen. In particular, initiating may involve alerting an administrator so that the administrator can decide whether to put the security enhancement in place, whereas imposing automatically puts the security enhancement in place.

Some embodiments use or provide a method for adaptively detecting identity spray attacks, including the following automatic steps: noting 802 an attempt to access an account of a computing system; determining 804 whether the account is under an identity spray attack; when the determining determines that the account is under the identity spray attack, utilizing 806 a machine learning model to classify 808 the attempt, the machine learning model configured 906 according to training data which includes user agent reputation data and IP address reputation data; and when the classifying classifies 808 the attempt as an unauthorized attempt, applying 810 a security enhancement to the account.

Some embodiments are characterized by adaptivity in that the model 302 is retrained 906, 910. In particular, in addition to other steps of FIG. 8, some embodiments further include adapting 908 the machine learning model 302 to detect a change in identity attack 212 behavior by at least partially retraining 910 the machine learning model 302 using updated training data 308 that includes updated user agent reputation data 312 not previously used for model training or updated IP address reputation data 316 not previously used for model training, or both, and then performing the method 800 with the adapted machine learning model 302.

Some examples of user agent reputation training data 308, 312 are illustrated in FIG. 10. In some embodiments, the user agent reputation data 312 includes at least one of the following: a browser identification 1004 at least partially identifying a browser 1002, 124 used to attempt access 320 (e.g., UserAgent data from a browser's user agent string that helps identify which browser is being used, what version, and on which operating system), a mobile application identification 1006 at least partially identifying a mobile device application 1008, 124 used to attempt access 320 (e.g., UserAgent data from a mobile device 102), a client application identification 1012 at least partially identifying an application 1010, 124 which sought access, or a user identification 606 identifying a user account 322 (e.g., UserId such as a username or email address or UUID that uniquely represents a user).

Some embodiments utilize a credential hash set or a credential hash list. As used herein, a "set" is an unordered collection, whereas a "list" is an ordered collection. In some embodiments, the machine learning model 302 is configured 906 according to training data which includes a set 636 of credentials 610 (represented by hash values for enhanced privacy) which have been used against a given user in access attempts within a specified time period. In some embodiments, the machine learning model 302 is configured 906 according to training data which includes a list 638 of credentials 610 (represented by hash values for enhanced privacy) which have been used against a given user in access attempts within a specified time period. In either or both cases, the hashes used for training 906, 914 may be truncated for even greater privacy protection.

In some embodiments, the machine learning model 302 is configured 906, 916 according to training data which includes a fuzzy collection of credentials 918, 610 which have been used in access attempts 318 within a specified time period. The fuzzy collection groups users which have similar but not identical credential collections, under a predefined collection similarity metric 920, e.g., a Hamming distance or Levenshtein distance.

Some embodiments utilize 912 a large number of ML signals, e.g., at thirty of them. In some, the machine learning model 302 is configured according to training data which includes at least thirty distinct signal types. Some embodiments leverage over three hundred features ranging from behavioral data to IP and UserAgent reputation.

In particular, a given embodiment may use none, some, or all of the following signals, or others identified in the present disclosure, for example, with the set of signals used in a given implementation being ascertainable and tuned by one of skill in the art based on teachings herein, and based on results obtained from test data or production data or both which are classified by the implementation's model 302: aggregates 640 that may give an indication of whether a User Agent is being used by an attacker (e.g., Success/Failure counts/percents, Member Not Exists (MNE) counts/percents, Disabled user counts/percents, Repeated bad password counts/percents), anonymizer service, APLC_RiskLevel_AdaptiveProtectionRiskLevelLow, APLC_RiskScore, Asn, authentication protocol, Call, device ID existence, Ests_FamiliarLocation, Ests_Sharkfin, FF_BestKnownAsnPatternType_RamPatternTypeRare, FF_BestKnownLocationPatternType_RamPatternType, FF_BestKnownIPPatternType_RamPatternTypeFrequency, FF_MatchScore, IdmI_ImpossibleTravel, IPR_FF_DeviceMatchUserCount, IPR_LegacyProtocollmapUserPercent, IPR_UsersWithMaxDistance, Ips_AttackerThumbprint, Ips_Sharkfin, Location, Mcas_Velocity, measure of location frequency, measure of locked out users, protocols (e.g., ActiveSync, Autodiscover, Mapi, OfflineAddressBook, Powershell, REST, RPC, SMTP, WebServices), RamRecommendedAction_RamActionAccountRiskHigh, TimeOfDay, UA_UserCountDisabled, UA_UserCountDisabled_Unfamiliar, UserAgent.

One of skill will understand that although examples herein may use terminology such as "UserAgent", "FF_" prefix, other identifier prefixes or naming conventions, and the like, which may be specific to particular environments (e.g., Microsoft environments), functionally similar or equivalent values may nonetheless be used in other environments. The teachings, and the embodiments described herein, are not limited to Microsoft environments, and not limited to other vendor-specific or service-provider-specific environments.

In some embodiments, the machine learning model is configured according to training data which includes truncated credential hashes. Some embodiments use 914 truncated credential hashes as opposed to full credential hashes or plaintext passwords. Use of truncated credential hashes protects user privacy, at the cost of reduced visibility into spray attacks 212. A given embodiment may truncate the hashes to fill, e.g., N credential buckets where N may be 32, 64, 128, or another value (but likely a value under 1000). Truncation helps prevent rainbow table construction, thereby promoting user security.

In some embodiments, strongly familiar access attempts are removed 922 from training data 308. In some, the machine learning model is configured according to training data which excludes 922 an access attempt against a given account when the access attempt has at least one of the following characteristics: an origin location that is familiar under a specified metric 920 to a known location of an authorized access attempt against the given account, or a user agent that is familiar under a specified metric to a known user agent of an authorized access attempt against the given account. The specified metric may be, e.g., a cosine or other similarity metric.

One advantage of embodiments taught herein is that they may detect identity attacks sooner than mechanisms that lack such adaptivity. For example, access to an account may be restricted before the account would have been locked under a conventional approach. In some embodiments, the method imposes 810 an access restriction 304 on access to a target account before an account lockout threshold number of failed sign-ins has been directed to the target account. As another example, access to an IP address may be restricted before the IP address would have been blocked under a conventional approach. In some embodiments, the method imposes 810 an access restriction on access from a source location before a source location blocking threshold number of failed sign-ins has been directed from the source location.

Some embodiments track sign-in attempts using wrong (e.g., unknown) usernames 606. That is, instead of (or in addition to) tracking wrong passwords some embodiments track wrong usernames. This may be part of tracking failed sign-ins from an IP address 314. Tracking wrong usernames may track usernames that don't exist in the monitored account, or that don't exist in the monitored network 130 as a whole. Tracking wrong usernames from a location 314 may provide an alternative or additional indicator of an attempted attack 212 and could be useful to help stop traffic from that source location.

It is expected, but not required, that many if not most identity attacks 212 will come from outside the monitored network 130. But teachings herein may also be applied to defend against an insider attack. In some embodiments, imposing 810 an access restriction includes restricting access attempts that come from inside the monitored network 130.

Some embodiments distinguish between the locations that are sources of failed logins according to whether they were previously associated with an owner of the account the failed login was aimed at. In particular, in some embodiments a set of familiar locations 624 and a set of unfamiliar locations have separate counters. A location is deemed familiar when the location has been previously associated with an authorized user of the target account, and otherwise the location is deemed unfamiliar.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as training data 308, machine learning models 302, events 206, attack detection and defense software 328, and feature 1108 values, in the form of data 118 and instructions 116, read from a removable storage medium 114 and/or another source such as a network connection, to form a configured storage medium. The configured storage medium 112 is capable of causing a computer system 102 to perform technical process steps for identity spray cyberattack detection and defense, as disclosed herein. The Figures thus help illustrate configured storage media embodiments and process (a.k.a. method) embodiments, as well as system and process embodiments. In particular, any of the process steps illustrated in FIG. 8, 9, or 11, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a method for adaptively detecting identity spray attacks. This method includes: training 906 a machine learning model for access attempt classification, the training performed at least in part through supervised machine learning with training data 308 that includes user agent reputation data and IP address reputation data; noting 802 an attempt to access an account of a computing system; utilizing 806 the trained machine learning model to classify 808 the attempt; and when the classifying classifies the attempt as an unauthorized attempt, applying 810 a security enhancement to the account.

Some embodiments use access attempt origin location signals. In some embodiments, the data used in the training includes at least one of the following: an internet autonomous system number 632 of an origin location of an access attempt, or a periodicity count of an origin location of an access attempt.

Some embodiments use access attempt user agent signals. In some embodiments, the training data used in the training includes at least one of the following user agent reputation data aggregates 640: a count of successful access attempts by a given user agent, a count of failed access attempts by a given user agent, a percent of successful access attempts by a given user agent, a percent of failed access attempts by a given user agent, a count of access attempts by a given user agent resulting in a member not exists error, a percent of access attempts by a given user agent resulting in a member not exists error, a count of access attempts by a given user agent resulting in an account disabled error, a percent of access attempts by a given user agent resulting in an account disabled error, a count of repeated bad passwords in access attempts by a given user agent, or a percent of repeated bad passwords in access attempts by a given user agent.

Some approaches to password spray detection have relied heavily or dispositively on per IP totals, and as a result may be circumvented by attackers who cycle through thousands of IPs to keep the request volume of each IP to a minimum. A complementary algorithm detects password spray attacks that span across multiple IP addresses, by utilizing additional signals as taught herein. In some embodiments, the model correctly classifies 932, 808 the attempt as an unauthorized attempt even when the attempt is part of a credential spray attack which cycles through at least one thousand IP addresses as origin locations.

Some embodiments periodically or frequently update the ML model. In some, for example, the method includes updating 924 the machine learning with training data which is based at least in part on access attempts which occurred no more than one week prior to the updating.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments provide cloud-based identity spray detection with an adaptive classification machine learning system. For example, a Microsoft Azure® Active Directory® environment may provide a password spray signal as an offline risk detection (marks of Microsoft Corporation). A risk event is triggered when a password spray attack has been successfully performed. A password spray attack occurs, e.g., when multiple user names are attacked by using common passwords in a common brute force attack to gain unauthorized access to an account by guessing the password through continuous attempts. Tools may look at patterns of traffic when users are under attack from password spray with different credential hashes tried against each user and combine that data with IP reputation data. Tools may look at how much failed traffic comes from each IP, and combine that additional information with behavioral data for each user (included as familiar locations). With that, a tool may take into account additional patterns seen in incoming requests, and leverage the data to compare against previous familiar patterns usually seen from that user. In most cases, the password spray detection has very high accuracy, and when the detection triggers the user is deemed to be in a high-risk state. This state change will impact the user and enforce, e.g., conditional access or identity protection policies 304 to kick in. Machine learning systems may leverage existing expert heuristics and may be trained continually, meaning that such an ML-enhanced system is able to learn from new patterns of attack and adapt its classification accordingly.

Some embodiments look at global patterns, not just a specific cloud tenant. Through usage by, or through integration with, a cloud service provider, an embodiment may receive data for a totality of traffic across the globe or another large region for all of the IPs that have crossed the service provider's authentication system.

Some embodiments combine heuristics with machine learning to create an adaptive model that is able to change to adapt to new attacker patterns; the model evolves continually and is not limited to just using the same heuristics. Some embodiments leverage over three hundred features, ranging from behavioral data (e.g., familiar locations, familiar devices) to IP and UserAgent reputation. Some embodiments protect users' privacy by using irreversible credential hashes as a datapoint, to detect when multiple passwords are tracked against each user. Some track the history of passwords tried against hundreds of millions of users to establish when users have been exposed to password spray. Some use machine learning to enable an adaptive classification system that decides which users at risk have been compromised. In some, an ML system leverages existing expert heuristics and is trained continually, meaning that it is able to learn from new patterns of attack and adapt its classification system. In some embodiments, this system is used to flag users as high risk, a characteristic that can be leveraged by an identity protection system to reset the user's password and block further attacks.

Password spray detection helps protect customers, by detecting or reducing or deterring or otherwise mitigating risks arising when bad actors can access user accounts and compromise user identities. Teachings herein, properly implemented and applied, can help uphold customer trust and help position a service provider as a leader in identity security. On a more granular level, identity attack detection can serve as a signal to notify an admin about an attack that is happening within or against their organization, allowing steps to be taken per an access policy, for example, such as multifactor authentication or a password change to secure the high-risk user's account. An embodiment may also feed risk events into user risk scoring to evaluate the probability that an actor trying to authenticate is good or bad.

Some embodiments train using 906 credential hash sets 636 or credential hash orders 638, or both. One indicator of a password spray attack is the presence of multiple failed login attempts with one or more distinct incorrect passwords. Assuming attackers 214 cycle through the same set of passwords amongst their target accounts, it is possible to isolate their attack by clustering users based on the set of credential hashes that have been tried against each user. The membership to these clusters can then be used as an indicator of a password spray attack.

Some helpful signals can be derived in such a situation. One signal is a credential hash set, namely, an unordered set of the passwords that have been tried against a user within a given time period. Since this signal does not take into account the order of the passwords as they were tried, this may be more sensitive (yield higher recall) than a signal based on credential order. Another signal is credential hash order, namely, an ordered list of the passwords that have been tried against a user within a given time period. Compared to the hash set, this signal would cover a lower amount of cases, but can be expected to be more specific (yield higher precision) in the most egregious cases. For example, if one hundred users all had the same ten incorrect passwords tried against them, in the same order, there is little doubt that these users were targeted by a password spray. A third signal is a fuzzy credential hash set that groups users with similar but not identical hash sets. This signal provides an opportunity to increase the recall of this feature even further.

Another group of helpful signals indicate User Agent reputation or IP reputation. Some IP-based aggregates 640 can be useful to determine if requests from an IP-address are legitimate or not, and some attackers can be profiled by the User Agents they attach to their requests. Some of the aggregates 640 that may give an indication of whether a User Agent is being used by an attacker 214 include: Success/Failure counts/percents, Member Not Exists (MNE) counts/percents, Disabled user counts/percents, Repeated bad password counts/percents.

Even when a defense focuses on detecting requests coming from attackers that are effective at making the behavior of an IP address appear non-anomalous, IP-based aggregates may still be useful to the model 302, especially if they account for temporal variations in these aggregates, e.g., moving averages, standard deviation across time. Several IP-based features are noted at various points herein, and in particular IP-based aggregates may be selected to take into account temporal changes.

As to model 302 options, some embodiments use features presented herein to train 906 a classification model 302 to detect an identity spray attack. Since supervised classification requires labels to train a model, features may be correlated with graded data over a period of two to six months, for example. Graded requests may be found to have an overlap, e.g., with credential hash set or order clusters. From these, unfamiliar requests may be used to train and validate, e.g., a Boosted Tree classification model 302 using, e.g., a 70%/30% train/test split and, e.g., Scikit-Learn or another machine learning library. It may be observed that the percent of compromised accounts detected increases with the number of cred hashes in the cred hash set. Similarly, the performance of a model may be greater for hash sets of four or more distinct credential hashes.

For some embodiments, new data may be manually graded in order to train a more robust model to detect password spray attacks. The requests that are sampled for grading, may for example meet the following criteria: Not business-to-consumer, Not strongly familiar, Successful authentications, User has had bursts of incorrect password attempts (with at least 4 distinct password hashes) for the same UserAgent and ClientApplication (authentication protocol) within the past 15 days. Samples may also be weighted to ensure an even mix of older and newer authentication protocols were used. 1500 or more cases, for example, may be graded as Compromised, Suspicious or NOT Compromised and used for training or validation of the new model. In a variation, separate models may be trained for the older (legacy) and newer (modern) authentication protocols. Data 308 preparation may include applying regularization and data rebalancing techniques (e.g., random under/oversampling, SMOTE-ENN, SMOTE-Tomek).

Use of a trained model 302 may be complementary to an existing password spray detection. Model usage may increase detection coverage for cases where attackers reduce the usage of each IP. However, it does not necessarily replace other identity detection tools, as there may be cases where the new model does not detect attacks which are detected by an existing tool.

However, when an original detection is based on IP-based counts, and the model-based detection is based on UserAgent and ClientApplication counts, then cases not picked up by the model may be cases where an attacker first performs the password spray in IMAP and once they have a correct password they use SMTP for successful authentications. Since the requests on SMTP are with the correct password, they do not accrue to the failed cred hash counts used by the model.

The overlap and increase in detections may vary depending of the protocol. In some cases, the largest gains may be seen in IMAP. The model may be better at detecting previously undetected cases in IMAP as opposed to SMTP, for example. This may occur when IMAP is first used by attackers to password spray until a valid credential is found, and then SMTP (and potentially other protocols) are used predominantly with valid credentials. Because IP addresses are still re-used by attackers between IMAP and SMTP, an existing detection may still flag the traffic on SMTP. In some embodiments, the model 302 may be improved by including per-IP failed hash counts and total per-user failed hash counts as features 1108.

In some embodiments, a signal 1108 may be improved by reducing its reliance on per-Client Application counts, and instead using only per-user failed cred hash counts. If more grading data can be leveraged, the model can be improved to further increase its recall.

A model-based system 302, 208 may be implemented, e.g., using Apache Spark™ or another unified analytics engine for big data processing or a suitable general-purpose cluster-computing framework (mark of The Apache Software Foundation).

With reference to FIG. 11, for some embodiments a fifteen-day history 1102 of failed attempts is maintained. The history may also be for a different time period, e.g., thirty or forty-five or sixty days. In some embodiments the history tracks, or reveals upon analysis, per UserID, ClientApplication, and UserAgent patterns of distinct failed credential hashes tried against the user within one hour, or another period such as thirty or ninety or one-hundred-twenty minutes. In some, only UserID is tracked. From the history, an embodiment extracts a list or set 1104 of at-risk UserIDs, or at-risk UserID, ClientApplication, and UserAgent tuples, that meet or exceed a failed hash count threshold, e.g., four or more login failures. In some embodiments, ClientApplication identifies a protocol, e.g., an authentication protocol used by a client.

Further, a daily (or other period such as 48 hour or 72 hour) list or set 1106 of non-strongly-familiar correct password attempts is maintained. By comparing the at-risk tuples 1104 to the successful but unfamiliar attempts 1106, an embodiment gets requests of flagged items 1104, which are fed to the model 302 as signals 1108. Other signals 1108 fed to the model in a given embodiment may include, e.g., ESTS data, IP reputation data, and User Agent reputation data. The trained model 302 produces an anomaly score for a given account access attempt, and if the score exceeds a specified threshold (experimentally determinable) then the attempt is classified as part of an identity attack, that is, the attack is detected 1110. "Part of" an attack includes accesses attempted during an on-going attack, as well as accesses performed during lulls in the attack that use credentials confirmed by the attack as valid, and accesses performed after the on-going portion of the attack has ended that use credentials confirmed by the attack as valid.

Some embodiments leverage over three hundred features ranging from behavioral data to IP and UserAgent reputation. However, fewer features may also be used to good effect. For example, some embodiments rely primarily or entirely only on some or all of the following features: APLC score, Client Type (a.k.a. Protocol) where the request is coming from, IP-based features (success vs. failure rates, invalid username counts, distinct failed credential hash counts, User-Agent based features (success vs. failure rates, invalid username counts, distinct failed credential hash counts), User based counts of recent distinct failed credential hashes, distance to closest familiar location, indicators of whether Device ID, IP Address, Browser ID, ASN and locations are known to the user.

Some embodiments intentionally avoid using features that would be particular to a specific attack and induce overfitting, such as User Agent strings, country names, application names, error codes, etc.

Additional support for the discussion above is provided below. For convenience, this additional support material appears under various headings. Nonetheless, it is all intended to be understood as an integrated and integral part of the present disclosure's discussion of the contemplated embodiments.

Technical Character

The technical character of embodiments described herein will be apparent to one of ordinary skill in the art, and will also be apparent in several ways to a wide range of attentive readers. Some embodiments address technical activities such as detecting password spray attacks and applying cybersecurity authentication enhancements, which are each an activity deeply rooted in computing technology. Some of the technical mechanisms discussed include, e.g., machine learning models 302, software 328, interfaces 306, 326, hashes 612, credentials 610, and protocols 604. Some of the technical effects discussed include, e.g., faster identity attack detection based on machine learning than is provided when detection does not utilize an ML model, and attack 212 detection despite an attacker's use of rotating IP addresses 314. Thus, purely mental processes are clearly excluded. Other advantages based on the technical characteristics of the teachings will also be apparent to one of skill from the description provided.

Some embodiments described herein may be viewed by some people in a broader context. For instance, concepts such as authentication, failure, identity, patterns, and security may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically and effectively assess the likelihood that certain accounts and IP addresses are part of a cyberattack. Other configured storage media, systems, and processes involving authentication, failure, identity, patterns, or security are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, machine learning features, operating system environments, time period examples, software processes, security tools, identifiers, data structures, data selections, naming conventions, notations, control flows, pseudocode, identifier prefixes, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
APLC: Adaptive Protection at Login for Compromise.
BIOS: basic input/output system
CD: compact disc
CPU: central processing unit
CSV: comma-separated values
DVD: digital versatile disk or digital video disc
ENN: Edited Nearest Neighbors
ESTS: Evolved Security Token Service
FF: familiar features (a set of features that assess familiarity of a current request with the attributes of previous successful requests from the user involved)
FPGA: field-programmable gate array
FPU: floating point processing unit
GPU: graphical processing unit
GUI: graphical user interface
HIDS: host intrusion detection system
HTTP(S): hypertext transfer protocol (secure)
IaaS or IAAS: infrastructure-as-a-service
ID: identification or identity
IoT: Internet of Things
IP: internet protocol
IPR: IP reputation
LAN: local area network
ML: machine learning
NIDS: network intrusion detection system
OS: operating system
PaaS or PAAS: platform-as-a-service
RAM: random access memory
RPC: remote procedure call
REST: representational state transfer
ROM: read only memory
SIEM: security information and event management; also refers to tools which provide security information and event management
SMOTE: Synthetic Minority Over-sampling Technique
SMTP: Simple Mail Transfer Protocol
TCP: transmission control protocol
TPU: tensor processing unit
UA: user agent
UDP: user datagram protocol
UEFI: Unified Extensible Firmware Interface
URI: uniform resource identifier
URL: uniform resource locator
UUID: universally unique identifier
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

An "administrator" is any user that has legitimate access (directly or indirectly) to multiple accounts of other users by using their own account's credentials. Some examples of administrators include network administrators, system administrators, domain administrators, privileged users, service provider personnel, and security infrastructure administrators.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

A distinction may be made between a "signal" and a "feature" in some discussions of machine learning, in that "signals" are considered to be results of existing detection models, whereas "features" is a more general term that includes any datapoints used by the model, so "signals" is a subset of "features". However, these terms are used interchangeably herein, with each having the broader meaning of data that is used by a machine learning model for training or as input to a classification process of the model, or both.

As used herein, "graded" training data and "labeled" data refer to the same thing, which is data having an assigned classification, for use in supervised learning.

"Sharkfin" is an internal Microsoft name for an existing offline detection of credential compromise that flags sessions coming from IP addresses with bad reputation, e.g., IPs that have been blocked for having a high failure rate due to incorrect credentials or a high failure rate due to invalid usernames.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Identity attack detection operations such as parsing logs 204 to extract sign-in attempt results for multiple accounts of multiple users 104, identifying locations 314 and categorizing locations as to familiarity, updating 924 a machine learning model, triggering 810 multifactor authentication, locking 810 accounts 322, blocking 810 IP 314, and many other operations discussed herein, are understood to be inherently digital. A human mind cannot interface directly with a CPU or other processor, or with RAM or other digital storage, to read and write the necessary data to perform the identity attack detection 1110 or defense 810 steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, aggregating, applying, asking, blocking, classifying, counting, determining, enhancing, filtering, forcing, generating, identifying, marking, noting, selecting, suspending, training, truncating, updating, utilizing (and accesses, accessed, aggregates, aggregated, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as a "computational system" or "computing system", and when in a network may be referred to as a "node"

104 users, e.g., user of a monitored system 130

106 peripherals 108 network generally, including, e.g., LANs, WANs, software-defined networks, clouds, and other wired or wireless networks 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, UEFI, device drivers 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on 124 applications, e.g., word processors, web browsers, spreadsheets, games, email tools, commands 126 display screens, also referred to as "displays"

128 computing hardware not otherwise associated with a reference number 106, 108, 110, 112, 114

130 monitored computer network or computer, e.g., a system 102 whose resources or activity or both are logged, traced, analyzed, or otherwise monitored to provide or optimize cybersecurity; monitored networks 130 may include clouds, local area networks (LANs), client-server networks, software-defined networks, or networks which have at least one trust domain enforced by a domain controller, for example; these network categories may overlap, e.g., a LAN may have a domain controller and also operate as a client-server network; teachings herein may also be applied to detect identity attacks in networks which do not happen to match any of the examples listed here 202 communications between computers; may also be referred to as "traffic" or "packets", for example 204 logs, namely automatically created records of certain events in a computing system; may be in a syslog format, or another format; logs may include traffic logs from firewalls, security logs from workstations, security logs from servers, and logs provided to or generated by security information and event management (SIEM) tools; SIEMs may consolidate logs that were generated by one or more of a firewall, workstation, server, router, NIDS, HIDS, or other devices and tools; logs may overlap, e.g., the same events may appear in different logs; logs may also be obtained from sources that are not listed among these examples 206 event; may also be referred to as an "entry" or set of entries in a log or as data 118

208 identity attack detection system; may be a distinct component of a network, or be part of a SIEM, an intrusion detection system, an intrusion prevention system, or another aspect of cybersecurity infrastructure, for instance 210 identity attack detection functionality, e.g., software 328 or data structures used by or generated by software 328

212 identity attack, also referred to as "identity spray attack"; typically performed by an external or insider attacker who is acting beyond the scope of the authority (if any) granted to them by the owner of a monitored network, but may also be part of a penetration test or quality control test, for example 214 attacker, e.g., a person or automation who is acting within a network beyond the scope of the authority (if any)

granted to them by the owner of the network; may be external or an insider; may also be referred to as an "adversary"

216 network boundary, e.g., as defined by routers or gateways or IP address assignments; may also be referred to as network "perimeter"

218 cybersecurity center; may also be referred to as a "security operations center" or SOC; may be formally designated in an organizational chart, or may be implicit in the assigned duties of personnel, or both 302 machine learning model; this is a digital computational construct 304 security enhancement, e.g., an additional or different login requirement 306 interface to an ML model, e.g., an API 308 machine learning training data 310 user agent data in network communications 202

312 user agent reputation, e.g., history or estimated likelihood of user agent being malicious or compromised or both 314 IP address; IPv4 or IPv6; may also refer to a set of IP addresses, or a URL or a domain or another network origin or destination location 316 IP reputation, e.g., history or estimated likelihood of network location being malicious or compromised or both 318 attempt to access an account, e.g., a login attempt 320 access to an account; may be used as a verb or as a noun 322 account in a computing environment, e.g., a user account on a machine or in a cloud; may also be referred to as a "target account"; refers to any digital resource that requires user authentication as a precondition of access 324 access attempt classification produced using a model 302, e.g., indicating whether the access is authorized or non-authorized 326 interface to a system; may include, e.g., shells, graphical or other user interfaces, network addresses, APIs, network interface cards, ports; interface 306 is an example 328 identity attack detection software; may implement any of the methods 800 or 900, or any of the functionality 210, for example 402 Boosted tree machine learning system, subsystem, algorithm, software, methods, or data structures 404 Random forest tree machine learning system, subsystem, algorithm, software, methods, or data structures 406 Logistic regression tree machine learning system, subsystem, algorithm, software, methods, or data structures 408 Neural network or deep neural net tree machine learning system, subsystem, algorithm, software, methods, or data structures 410 Ensemble tree machine learning system, subsystem, algorithm, software, methods, or data structures 502 security enhancement system, subsystem, algorithm, software, method, or data structure which implements marking an account as compromised or having a high risk of being compromised 504 mark an account 322 as compromised or having a high risk of being compromised; performed computationally 506 security enhancement system, subsystem, algorithm, software, method, or data structure which implements generating a security alert 508 generate a security alert; performed computationally 510 security alert, e.g., digital message to a SIEM or an admin notifying them of a suspicious event or set of events 512 security enhancement system, subsystem, algorithm, software, method, or data structure which implements blocking an authentication request 514 block an authentication request, e.g., by refusing access or imposing an additional requirement for access; performed computationally 516 authentication request, e.g., a request for account access which provides credentials to authenticate the identity or authority or both of the entity making the access request 518 security enhancement system, subsystem, algorithm, software, method, or data structure which implements forcing a password update 520 force a password update; performed computationally 522 password or passphrase 524 security enhancement system, subsystem, algorithm, software, method, or data structure which implements asking for multifactor authentication 526 ask for multifactor authentication as a requirement for access 320

528 multifactor authentication 530 security enhancement system, subsystem, algorithm, software, method, or data structure which implements suspending access to an account 532 suspend access to an account; may also be referred to as "suspending an account"; performed computationally 602 identification of a protocol 604

604 protocol, e.g., a network communication protocol, a cybersecurity protocol 606 username generally; may be in particular a wrong username for an account of interest, e.g., a username that is not recognized as part of proper authentication in the context of a particular target account 608 count of wrong usernames; may be exact or a range or an enumeration value 610 access or authentication or authorization credential, e.g., password or access token 612 hash, e.g., hash of a password 614 count of password hash instances; may be exact or a range or an enumeration value 616 rate of successful access attempts, or rate of failed access attempts; may be exact or a range or an enumeration value 618 ratio of successful access attempts to failed access attempts; may be exact or a range or an enumeration value 620 geographical distance (e.g., miles or kilometers) or other travel distance (e.g., minimum time by fastest travel vehicle)

622 apparent location, e.g., originating IP address or state or country of an access attempt 624 familiar location, e.g., IP address or state or country of an access attempt which is known to have been used before with proper authentication sufficiently to infer the user was the intended user not an attacker 626 indication (e.g., digital value) whether an attribute of an access (any discernible digital value associated with the access) is a familiar attribute 630 familiar attribute of an access, namely, one known to have been used before with proper authentication sufficiently to infer the user was the intended user not an attacker 632 internet system number (ASN—autonomous system number)

636 set of credential hashes 638 list of credential hashes 640 aggregate value, created from multiple digital values, e.g., a count or percent or rate or ratio of values, e.g., a count of successful access attempts or a percent of repeated bad passwords 702 user agent string 704 country name or code 706 application name
708 error code
710 attribute 628 that is specific to a particular identity attack 212
800 flowchart; 800 also refers to identity attack detection and defense methods illustrated by or consistent with the FIG. 8 flowchart
802 note an access attempt, e.g., by receiving or extracting a login event 206; performed computationally
804 determine an account is under attack, e.g., by the number of failed login attempts within an hour; performed computationally
806 utilize a model 302, e.g., by submitting access data to the model for classification; performed computationally
808 classify an access attempt; performed computationally by a model 302
810 apply a security enhancement; performed computationally; may include, e.g., (a) reporting an attack candidate, e.g., by providing content (e.g., conditions met, timestamp) in a text message, email, generated-voice message, printout, alert, screen display, or other communication to an administrator or to security personnel or both, (b) triggering defense code, e.g., by making a remote procedure call, or by sending a message, signal, or other digital action or communication to a tool such as an intrusion prevention system, firewall, or exfiltration prevention tool in order to request (as a possible action or as a command) that the triggered tool impose an access restriction, (c) imposing an access restriction, (d) locking an account, (e) blocking a location, e.g., an IP address or device or geolocation, (f) requiring additional authentication beyond a username and passphrase before permitting access to a target account or accepting further communication from a source location, where additional authentication beyond a username and passphrase may include, e.g., a one time password (OTP) sent by text message or email or generated by an authenticator app, or a biometric credential such as a fingerprint scan result, voiceprint, face recognition, or iris scan result, or a verified presence of a hardware token, or a digital token or certificate, or (g) taking any other computational action identified herein as application of a security enhancement or an attack defense
900 flowchart; 900 also refers to identity attack detection and defense methods illustrated by or consistent with the FIG. 9 flowchart (which incorporates the steps of FIGS. 8 and 11)
902 include particular data or data categories among training data 308
904 exclude particular data or data categories from training data 308
906 configure a machine learning model; may also be referred to as training the model, although configuring as a practical matter may also involve testing with data, tuning model parameters, selecting which signals to present for classification, and operably linking the model to other software 328 through an interface 306, for example
908 adapt a model 302 by retraining, e.g., perform additional configuring after a model is initially trained
910 retrain a model, e.g., using different signals or different training data than were used for initially training the model
912 train a model using at least a specified number of signals, e.g., at least thirty feature 1108, or at least one fifty or at least one hundred or at least three hundred features 1108
914 train a model using truncated credential hashes instead of full hashes or actual password strings
916 train a model using fuzzy credential sets or lists
918 fuzzy credential sets or lists
920 similarity metric, e.g., vector distance metric, string distance metric, binary values distance metric such as Hamming code
922 exclude familiar locations or familiar user agents or both from training data
924 update a machine learning model, e.g., by step 908 or by adding a feature, e.g., to distinguish between authentication protocols
926 train a model 302 using active learning
928 active learning for training 906
930 labeled or graded examples for training 906
932 classify an access attempt; performed computationally by a machine learning model 302
934 any step discussed in the present disclosure that has not been assigned some other reference numeral
1002 web browser (software)
1004 partial or complete identification of a browser 1002
1006 partial or complete identification of a mobile device application
1008 mobile device application (software)
1010 client application (software)
1012 partial or complete identification of a client application; referenced groups may overlap, e.g., a web browser on a smart phone that is communicating with a server is a browser 1002 and is also a mobile device application 1008 and is also a client application 1010
1102 failed access attempts data 118
1104 at-risk users or user tuples data 118
1106 successful but unfamiliar access attempts data 118
1108 digital signals or features fed as data 118 to a machine learning model for training 906 or to be classified 808; note that "signal" is a term of art in machine learning and should not be confused with signals in the patent law sense of signals per se or transitory signals which are non-statutory subject matter; signals 1108 are digital values in a memory 112
1110 detection of an identity spray attack or a victim (compromised account) of such an attack; may be a verb or a noun

CONCLUSION

In short, the teachings herein provide a variety of identity attack detection and defense functionalities which operate in enhanced systems 208. Cybersecurity is enhanced, with particular attention to identity spray attack 212 detection and defense. To detect 1110 identity spray attacks 212, a machine learning model 302 classifies 808 account access attempts 318 as authorized or unauthorized, based on dozens of different pieces of information (i.e., machine learning model features 1108). Boosted tree 402, neural net 408, and other machine learning model technologies 302 may be employed. Model training data 308 may include user agent reputation data 312, IP address reputation data 316, device or agent or location familiarity indications 624, 630, authentication or other network protocol identifications 602, aggregate values 640, and other data 118. Account credential hash sets 636 or hash lists 638 may serve as model inputs. Hashes 612 may be truncated to further protect user privacy. Classifying 808 an access attempt 318 as unauthorized 324 may trigger application 810 of multifactor authentication 528, password change requirements 520, account suspension 532, or other security enhancements 304. Statistical or heuristic detections may supplement the model. However, the model may adapt 908 to changed attacker behavior through retraining

910 with updated data 308, making model-based security approaches taught herein more effective over time than rigid statistical or heuristic detection approaches.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into SIEM software. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 8 and 9 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system configured for adaptively detecting identity spray attacks, the system comprising:
   a digital memory;
   an interface to a machine learning model, the machine learning model configured according to training data which includes user agent reputation data and IP address reputation data; and
   a processor in operable communication with the digital memory, the processor configured to perform identity spray attack detection steps which include (a) noting an attempt to access an account, (b) determining whether the account is under an identity spray attack, (c) in response to determining that the account is under the identity spray attack, utilizing the machine learning model to classify the attempt, and (d) in response to classifying the attempt as an unauthorized attempt, applying a security enhancement to the account.

2. The computing system of claim 1, wherein the machine learning model includes at least one of the following:
   a boosted tree classification model;
   a random forest classification model;
   a logistic regression classification model;
   a neural network classification model; or
   an ensemble classification model.

3. The computing system of claim 1, wherein the security enhancement applied to the account includes at least one of the following:
   marking the account as compromised;
   generating a security alert which indicates the account access attempt was classified as unauthorized;
   blocking an authentication request;
   forcing a user to update a password;
   asking a user to perform multifactor authentication; or
   temporarily suspending access to the account.

4. The computing system of claim 1, wherein the machine learning model is configured according to training data which includes at least one of the following:
   a protocol identification identifying a network protocol used during failed access attempts;
   an invalid username count;
   a distinct failed credential hash count;
   a successful access attempt rate or a failed access attempt rate or a ratio of successful access attempts to failed access attempts;
   a distance from an access attempt apparent location to a previously defined familiar location; or
   an indication of whether an access attempt attribute is a previously defined familiar attribute used in an authorized access.

5. The computing system of claim 1, wherein the machine learning model is configured according to training data which has been selected or filtered or both to expressly exclude at least three of the following: user agent strings, country names, application names, error codes, or access attempt attributes which are specific to a particular attack.

6. The computing system of claim 1, wherein authentication protocol is a training signal, in that the machine learning model is configured according to training data which has been selected or filtered or both, to expressly exclude or to expressly include, access attempts which use one or more specified authentication protocols.

7. A method for adaptively detecting identity spray attacks, comprising:
   noting an attempt to access an account of a computing system;
   determining whether the account is under an identity spray attack;
   when the determining determines that the account is under the identity spray attack, utilizing a machine learning model to classify the attempt, the machine learning model configured according to training data which includes user agent reputation data and IP address reputation data; and
   when the classifying classifies the attempt as an unauthorized attempt, applying a security enhancement to the account.

8. The method of claim 7, further comprising adapting the machine learning model to detect a change in identity attack behavior by at least partially retraining the machine learning model using updated training data that includes updated user agent reputation data or updated IP address reputation data or both, and then performing the method with the adapted machine learning model.

9. The method of claim 7, wherein the user agent reputation data includes at least one of the following:
   a browser identification at least partially identifying a browser used to attempt access;
   a mobile application identification at least partially identifying a mobile device application used to attempt access;
   a client application identification at least partially identifying an application which sought access; or
   a user identification identifying a user account.

10. The method of claim 7, wherein the machine learning model is configured according to training data which includes a set of credentials which have been used against a given user in access attempts within a specified time period.

11. The method of claim 7, wherein the machine learning model is configured according to training data which includes a list of credentials which have been used against a given user in access attempts within a specified time period.

12. The method of claim 7, wherein the machine learning model is configured according to training data which includes a fuzzy collection of credentials which have been used in access attempts within a specified time period, and the fuzzy collection groups users which have similar but not identical credential collections under a predefined collection similarity metric.

13. The method of claim 7, wherein the machine learning model is configured according to training data which includes at least thirty distinct signal types.

14. The method of claim 7, wherein the machine learning model is configured according to training data which includes truncated credential hashes.

15. The method of claim 7, wherein the machine learning model is configured according to training data which excludes an access attempt against a given account when the access attempt has at least one of the following characteristics:
- an origin location that is familiar under a specified metric to a known location of an authorized access attempt against the given account; or
- a user agent that is familiar under a specified metric to a known user agent of an authorized access attempt against the given account.

16. A computer-readable storage medium configured with data and instructions which upon execution by a processor cause a computing system to perform a method for adaptively detecting identity spray attacks, the method comprising:
- training a machine learning model for access attempt classification, the training performed at least in part through supervised machine learning with training data that includes user agent reputation data and IP address reputation data;
- noting an attempt to access an account of a computing system;
- utilizing the trained machine learning model to classify the attempt; and
- when the classifying classifies the attempt as an unauthorized attempt, applying a security enhancement to the account.

17. The storage medium of claim 16, wherein the training data used in the training includes at least one of the following:
- an internet autonomous system number of an origin location of an access attempt; or
- a periodicity count of an origin location of an access attempt.

18. The storage medium of claim 16, wherein the training data used in the training includes at least one of the following user agent reputation data aggregates:
- a count of successful access attempts by a given user agent;
- a count of failed access attempts by a given user agent;
- a percent of successful access attempts by a given user agent;
- a percent of failed access attempts by a given user agent;
- a count of access attempts by a given user agent resulting in a member not exists error;
- a percent of access attempts by a given user agent resulting in a member not exists error;
- a count of access attempts by a given user agent resulting in an account disabled error;
- a percent of access attempts by a given user agent resulting in an account disabled error;
- a count of repeated bad passwords in access attempts by a given user agent; or
- a percent of repeated bad passwords in access attempts by a given user agent.

19. The storage medium of claim 16, wherein the method correctly classifies the attempt as an unauthorized attempt even when the attempt is part of a credential spray attack which cycles through at least one thousand IP addresses as origin locations.

20. The storage medium of claim 16, wherein method further comprises at least one of the following:
- updating the machine learning model with training data which is based at least in part on access attempts which occurred no more than one week prior to the updating;
- training the machine learning model using active learning wherein past decisions of the model are manually labeled and used as new training data, thereby providing labeled examples for the machine learning model to learn new attacker behaviors.

* * * * *